United States Patent
Yum et al.

(10) Patent No.: US 10,122,430 B2
(45) Date of Patent: Nov. 6, 2018

(54) METHOD OF TRANSMITTING CHANNEL STATE INFORMATION AND APPARATUS THEREFOR

(71) Applicant: LG Electronics Inc., Seoul (KR)

(72) Inventors: Kunil Yum, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 15/268,078

(22) Filed: Sep. 16, 2016

(65) Prior Publication Data

US 2017/0086195 A1  Mar. 23, 2017

Related U.S. Application Data

(60) Provisional application No. 62/220,256, filed on Sep. 18, 2015, provisional application No. 62/249,930, filed on Nov. 2, 2015.

(51) Int. Cl.
  *H04B 7/06* (2006.01)
  *H04L 5/00* (2006.01)
  *H04B 7/0417* (2017.01)

(52) U.S. Cl.
  CPC ......... *H04B 7/0626* (2013.01); *H04B 7/0417* (2013.01); *H04B 7/0695* (2013.01); *H04L 5/0057* (2013.01)

(58) Field of Classification Search
  CPC .. H04B 7/0626; H04B 7/0695; H04B 7/0417; H04L 5/0057
  See application file for complete search history.

(56) References Cited

U.S. PATENT DOCUMENTS

| | | | |
|---|---|---|---|
| 2010/0054200 A1* | 3/2010 | Tsai | H04B 7/0408 370/329 |
| 2013/0235742 A1* | 9/2013 | Josiam | H04W 24/10 370/252 |
| 2015/0043673 A1* | 2/2015 | Lee | H04B 7/0469 375/267 |
| 2016/0006122 A1* | 1/2016 | Seol | H04B 7/0408 342/372 |
| 2016/0050006 A1* | 2/2016 | Ko | H04B 17/00 370/329 |
| 2016/0182137 A1* | 6/2016 | Onggosanusi | H04B 7/0469 370/329 |
| 2016/0338064 A1* | 11/2016 | Kuo | H04W 72/0453 |
| 2017/0033912 A1* | 2/2017 | Onggosanusi | H04B 7/0626 |
| 2017/0244462 A1* | 8/2017 | Wei | H04B 7/0626 |

* cited by examiner

*Primary Examiner* — Gary Mui
(74) *Attorney, Agent, or Firm* — Dentons US LLP

(57) ABSTRACT

A method of reporting a downlink channel state, which is performed by a terminal in a wireless communication system, includes receiving a CSI process configuration including a plurality of channel state information-reference signal (CSI-RS) resources to which a different vertical precoding is applied from each other, measuring a CSI-RS on the plurality of the CSI-RS resources under an assumption that all of the plurality of the CSI-RS resources have the predetermined number of antenna ports, and reporting a beam index (BI) indicating a CSI-RS resource having a highest channel quality indicator (CQI) among the plurality of the CSI-RS resources corresponding to the measured CSI-RS resources to a base station.

6 Claims, 7 Drawing Sheets

METHOD OF TRANSMITTING CHANNEL STATE INFORMATION AND APPARATUS THEREFOR

This application claims the benefit of the U.S. Provisional Application Nos. 62/220,256, filed on Sep. 18, 2015 and 62/249,930 filed on Nov. 2, 2015, which are hereby incorporated by reference as if fully set forth herein.

BACKGROUND OF THE INVENTION

Field of the Invention

The present invention relates to a wireless communication system, and more particularly, to a method of transmitting a channel state information and an apparatus therefor.

Discussion of the Related Art

An antenna system utilizing an AAS (active antenna system) is about to be introduced after LTE Rel-12. Since the AAS is configured by an active antenna that each antenna includes an active circuit, the AAS is expected as a technology capable of more efficiently reducing interference and performing beamforming by changing an antenna pattern according to a situation. If the AAS is constructed in 2 dimensions (2D-AAS), it is able to more actively change a transmission beam according to a location of a receiving end in a manner of more efficiently adjusting a main lobe of an antenna in 3 dimensions in the aspect of an antenna pattern. It is anticipated that the 2D-AAS will construct a plurality of antenna systems by arranging antennas in horizontal direction and vertical direction.

SUMMARY OF THE INVENTION

Accordingly, the present invention is directed to an apparatus and method thereof that substantially obviate one or more problems due to limitations and disadvantages of the related art.

An object of the present invention is to provide a method of transmitting a channel state information in order to more efficiently report the channel state information and appropriately schedule for terminals.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of reporting a downlink channel state, which is performed by a terminal in a wireless communication system, comprising: receiving a CSI process configuration containing a plurality of channel state information-reference signal (CSI-RS) resources to which a different vertical precoding is applied from each other; measuring a CSI-RS on the plurality of the CSI-RS resources under an assumption that all of the plurality of the CSI-RS resources have the predetermined number of antenna ports; and reporting a beam index (BI) indicating a CSI-RS resource having a highest channel quality indicator (CQI) among the plurality of the CSI-RS resources corresponding to the measured CSI-RS resources to a base station.

Additionally or alternately, the plurality of the CSI-RS resources may be configured to correspond to the number of antenna ports different from each other.

Additionally or alternately, the measuring the CSI-RS on the plurality of the CSI-RS resources may include calculating a CQI for one or more BI candidates and the number of the one or more BI candidates may be restricted to a number equal to or less than a prescribed number.

Additionally or alternately, if the wireless communication system corresponds to a time division duplex system and CSI-RS resources greater than the predetermined number are configured for the CSI process, the BI may be reported after the specific number (nCQI-ref) of subframes from a subframe in which the plurality of the CSI-RS resources exist.

Additionally or alternately, if the wireless communication system corresponds to a frequency division duplex system, the BI may be reported after the specific number (nCQI-ref) of subframes from a subframe in which the plurality of the CSI-RS resources exist.

Additionally or alternately, if the number of CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, when a plurality of CSI processes are configured, if the total number of CSI-RS resources contained in the plurality of the CSI processes is equal to or greater than the predetermined number, the BI may be reported after the specific number (nCQI-ref) of subframes from a subframe in which the plurality of the CSI-RS resources exist.

Additionally or alternately, if the maximum number among the number of antenna ports for each of the plurality of the CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, if the sum of the number of antenna ports for each of the plurality of the CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, if the maximum number of antenna ports for the plurality of the CSI-RS resources contained in the CSI process is equal to or greater than the predetermined number, the BI may be reported after the specific number (nCQI-ref) of subframes from a subframe in which the plurality of the CSI-RS resources exist.

To achieve these objects and other advantages and in accordance with the purpose of the invention, as embodied and broadly described herein, according to another embodiment, a terminal configured to report a downlink channel state in a wireless communication system, comprising: a transmitter and a receiver; and a processor configured to control the transmitter and the receiver, the processor configured to receive a CSI process configuration containing a plurality of channel state information-reference signal (CSI-RS) resources to which a different vertical precoding is applied from each other, the processor configured to measure a CSI-RS on the plurality of the CSI-RS resources under an assumption that all of the plurality of the CSI-RS resources have the predetermined number of antenna ports, the processor configured to report a beam index (BI) indicating a CSI-RS resource having a highest channel quality indicator (CQI) among the plurality of the CSI-RS resources corresponding to the measured CSI-RS resources to a base station.

Additionally or alternately, the plurality of the CSI-RS resources may be configured to correspond to the number of antenna ports different from each other.

Additionally or alternately, the processor may be configured to calculate a CQI for one or more BI candidates to measure the CSI-RS on the plurality of the CSI-RS resources and the number of the one or more BI candidates may be restricted to a number equal to or less than a prescribed number.

Additionally or alternately, if the wireless communication system corresponds to a time division duplex system and CSI-RS resources greater than the predetermined number are configured for the CSI process, the BI may be reported after the specific number (nCQI-ref) of subframes from a subframe in which the plurality of the CSI-RS resources exist.

Additionally or alternately, if the wireless communication system corresponds to a frequency division duplex system, the BI is reported after the specific number (nCQI-ref) of subframes from a subframe in which the plurality of the CSI-RS resources exist.

Additionally or alternately, if the number of CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, when a plurality of CSI processes are configured, if the total number of CSI-RS resources contained in the plurality of the CSI processes is equal to or greater than the predetermined number, the BI may be reported after the specific number (nCQI-ref) of subframes from a subframe in which the plurality of the CSI-RS resources exist.

Additionally or alternately, if the maximum number among the number of antenna ports for each of the plurality of the CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, if the sum of the number of antenna ports for each of the plurality of the CSI-RS resources contained in the CSI process is equal to or greater than the predetermined number, the BI may be reported after the specific number (nCQI-ref) of subframes from a subframe in which the plurality of the CSI-RS resources exist.

Additionally or alternately, if the maximum number of antenna ports for the plurality of the CSI-RS resources contained in the CSI process is equal to or greater than the predetermined number, the BI may be reported after the specific number (nCQI-ref) of subframes from a subframe in which the plurality of the CSI-RS resources exist.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
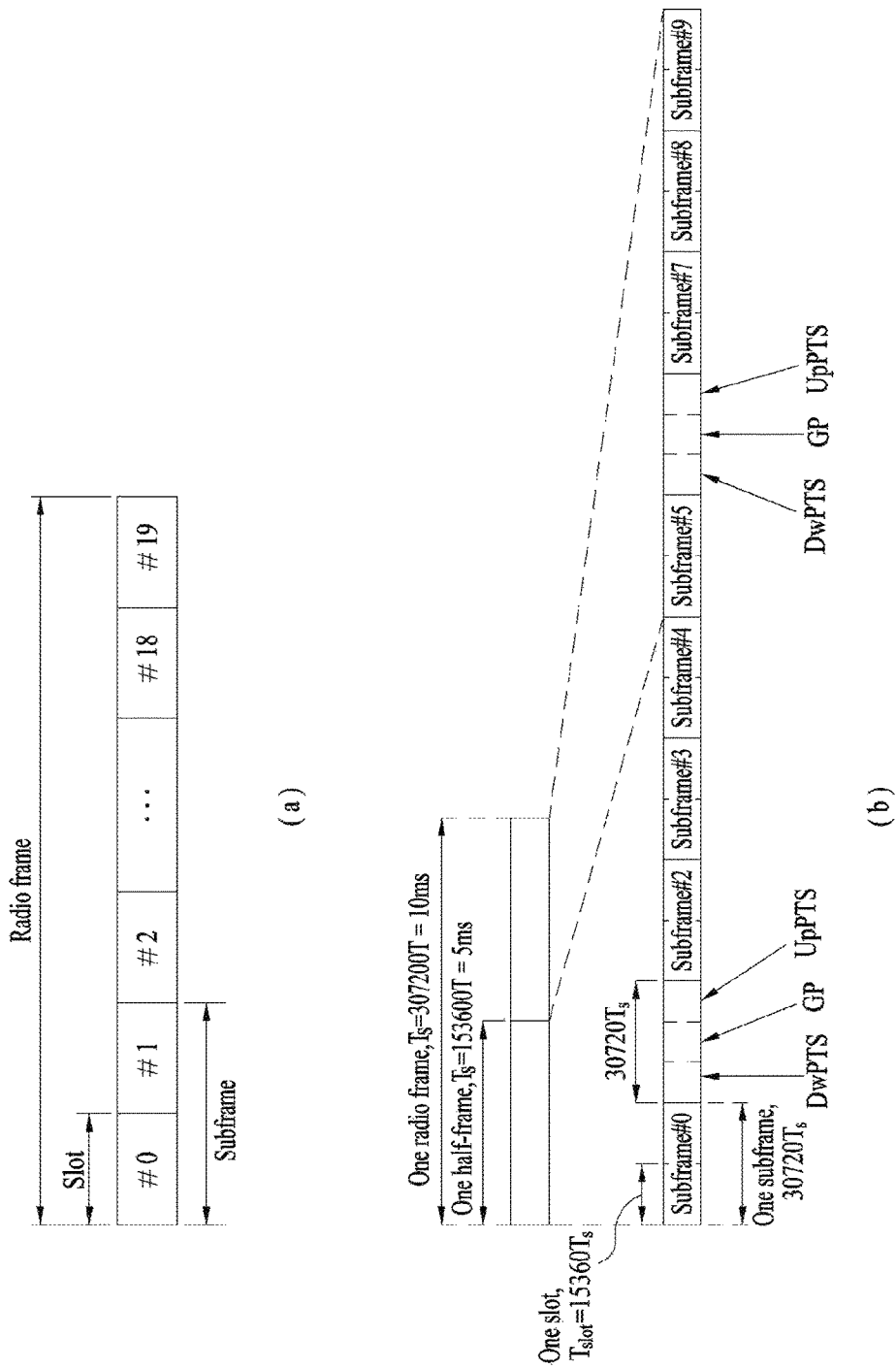
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link.

At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
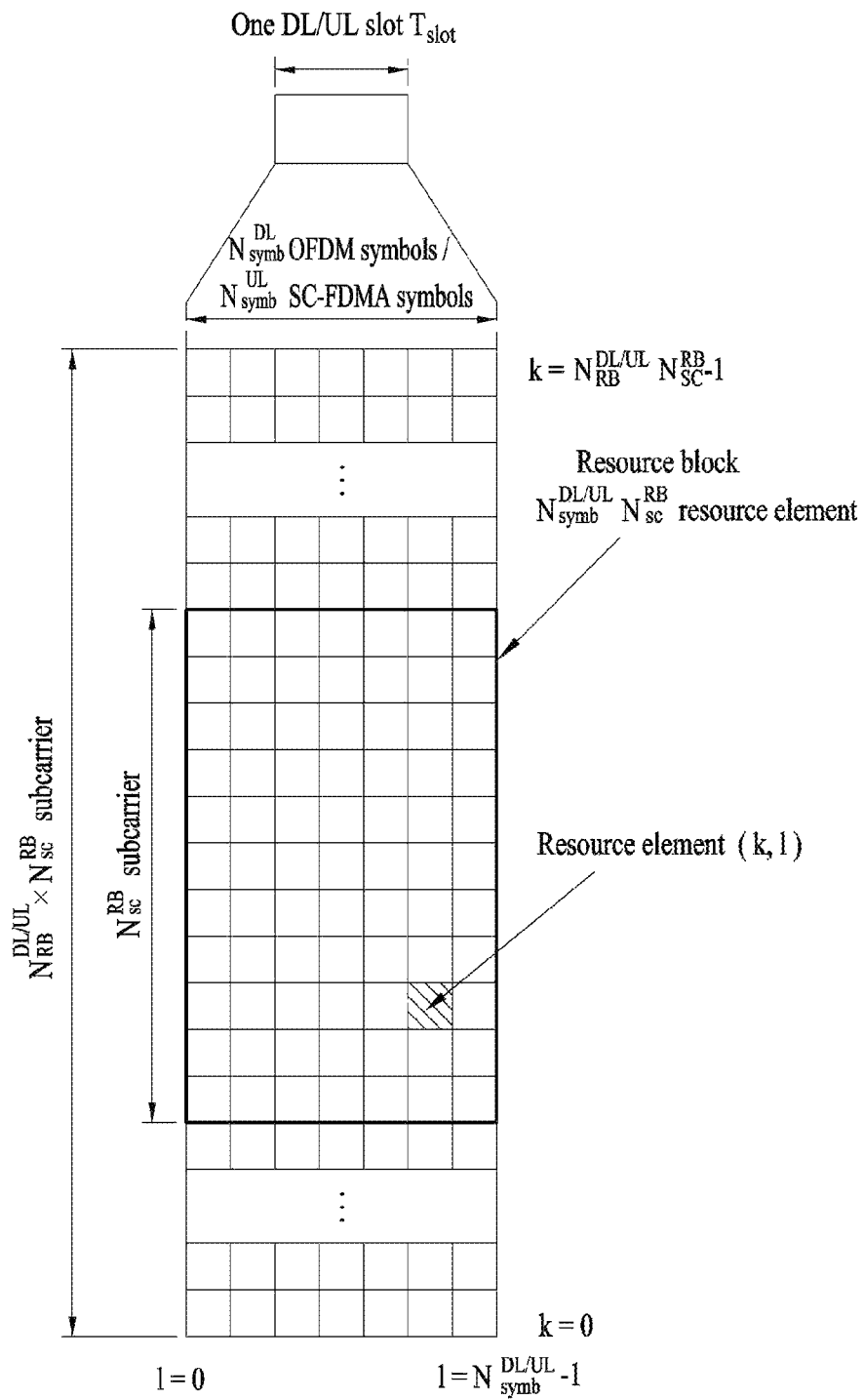
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
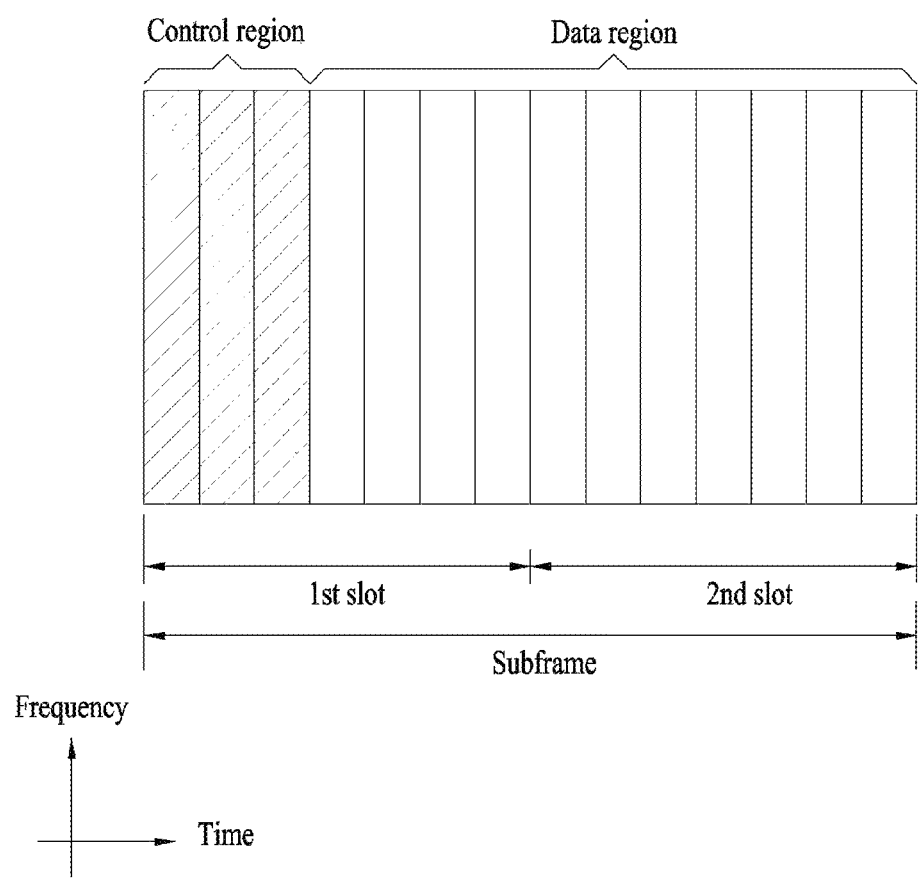
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
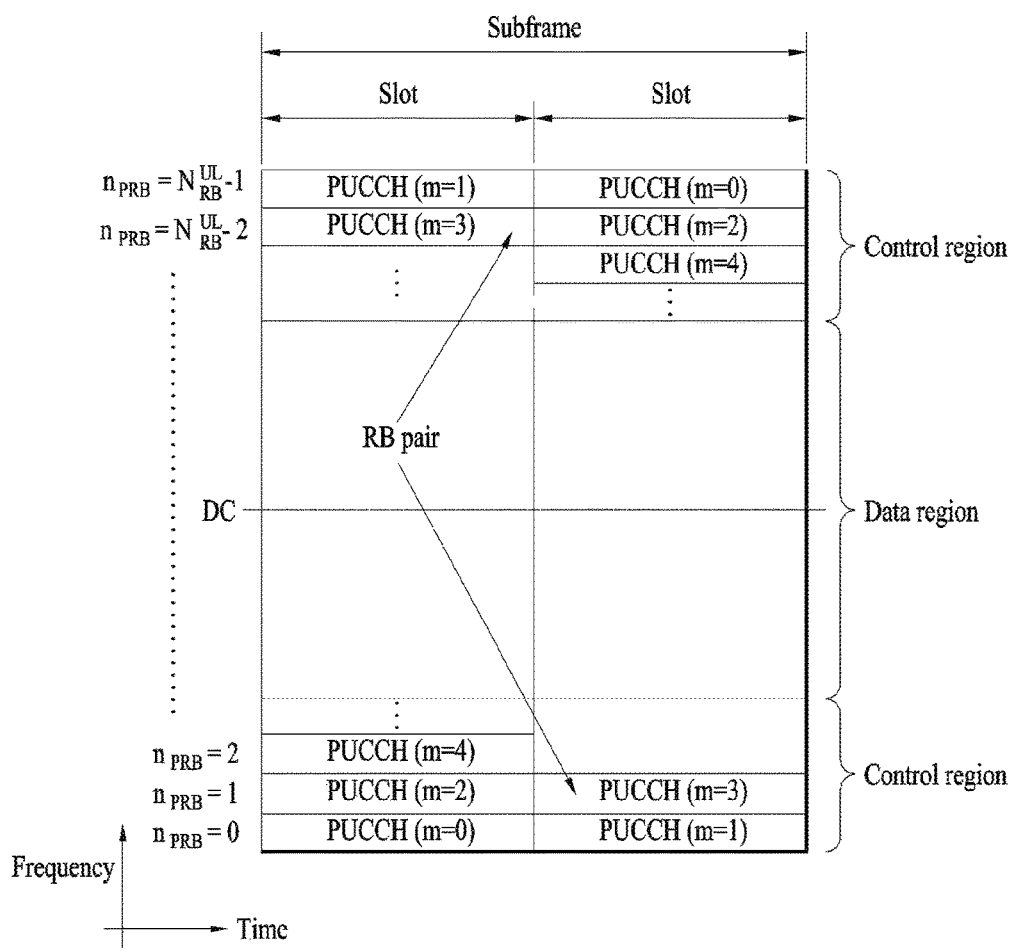
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

|  | PMI Feedback Type | | |
|---|---|---|---|
|  | No PMI | Single PMI | Multiple PMIs |
| PUSCH CQI Feedback Type | Wideband (Wideband CQI) |  |  | Mode 1-2 RI |

TABLE 6-continued

| | PMI Feedback Type | | |
|---|---|---|---|
| | No PMI | Single PMI | Multiple PMIs |
| UE selected (Subband CQI) | Mode 2-0 RI (only for Open-loop SM) 1st wideband CQI(4 bit) + Best-M CQI(2 bit) (Best-M CQI: average CQI for selected M SB(s) among N SBs) Best-M index (L bit) | | 1st wideband CQI(4 bit) 2nd wideband CQI(4 bit) if RI > 1 N * Subband PMI(4 bit) (N is the total # of subbands) (if 8Tx Ant, N * subband W2 + wideband W1) Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N * subband CQI(2 bit) | Mode 3-1 RI 1st wideband CQI(4 bit) + N * subbandCQI(2 bit) 2nd wideband CQI(4 bit) + N * subbandCQI(2 bit) if RI > 1 Wideband PMI(4 bit) (if 8Tx Ant, wideband W2 + wideband W1) | Mode 3-2 RI 1st wideband CQI(4 bit) + N * subbandCQI(2 bit) 2nd wideband CQI(4 bit) + N * subbandCQI(2 bit) if RI > 1 N * Subband PMI(4 bit) (N is the total # of subbands) (if 8Tx Ant, N * subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.
ii) Type 1a: A subband CQI and a second PMI are transmitted.
iii) Type 2, Type 2b, Type 2c: A wideband CQI and a PMI (WB-CQI/PMI) are transmitted.
iv) Type 2a: A wideband PMI is transmitted.
v) Type 3: An RI is transmitted.
vi) Type 4: A wideband CQI is transmitted.
vii) Type 5: An RI and a wideband PMI are transmitted.
viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

Figure 5:
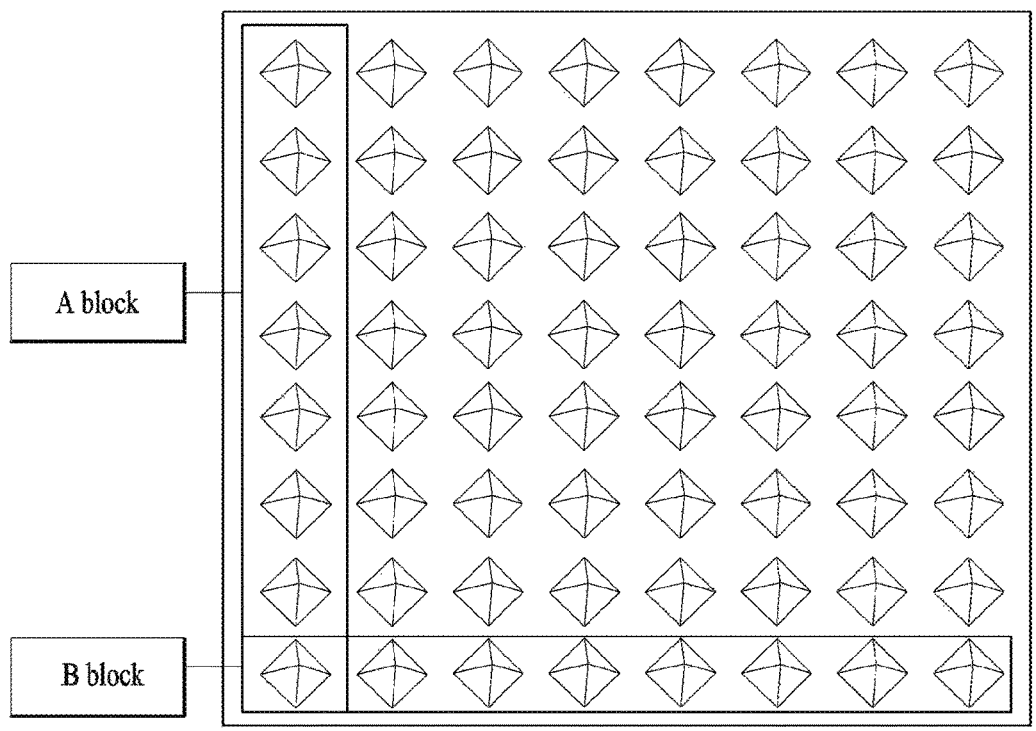
FIG. 5 is a diagram illustrating some antenna ports selected from a two-dimensional (2D) antenna array of the wireless communication system to which an embodiment of the present invention is applied.

An antenna system utilizing an AAS (active antenna system) is about to be introduced after LTE Rel-12. Since the AAS is configured by an active antenna that each antenna includes an active circuit, the AAS is expected as a technology capable of more efficiently reducing interference and performing beamforming by changing an antenna pattern according to a situation. If the AAS is constructed in 2 dimensions (2D-AAS), it is able to more actively change a transmission beam according to a location of a receiving end in a manner of more efficiently adjusting a main lobe of an antenna in 3 dimensions in the aspect of an antenna pattern. As shown in FIG. 5, it is anticipated that the 2D-AAS will construct a plurality of antenna systems by arranging antennas in horizontal direction and vertical direction.

Using a dimension of a vertical domain such as EB (elevation beamforming)/FD (full dimension)-MIMO being considered. To this end, LTE considers a method of using a vertical domain by making a UE select a CSI-RS in a manner of applying vertical beams different from each other to the CSI-RS. In this case, having selected a vertical beam, the UE transmits such a parameter as an index of the vertical beam or a codeword index indicating the vertical beam to a base station to make the base station know a vertical beam preferred by the UE. In this case, for clarity, the vertical beam index or indication corresponding to the index is referred to as a beam index (BI). The UE can directly transmit a predetermined index of a vertical beam to the base station. Moreover, if the indication forms a sort of codebook, a vertical domain can be transmitted to the base station in a manner of being included in a codeword index or a legacy feedback parameter (e.g., a codebook) of the codebook.

Or, the BI can be defined by a CSI-RS resource index required by the UE. In FD-MIMO, it may be able to define K number of CSI-RS resources, each of which includes $N_K$ ports within the number of ports as many as $N_{total}$ number of ports in a single CSI process. Transmission is performed by putting (applying) vertical precoding different from each other on/to each CSI-RS resource and the UE can measure a channel of each CSI-RS resource and select/use a CSI-RS resource.

For example, if the $N_{total}$ corresponds to 32, a single CSI process can include 4 CSI-RS resources, each of which includes 8 ports. In this case, BI indicates a corresponding CSI-RS resource instead of a (vertical) precoding index.

The UE should perform channel measurement to determine a vertical beam preferred by the UE. A method of performing the channel measurement may vary depending on a method of measuring an RS measured by the UE.

Alt 1: RSRP (Reference Signal Received Power)-based BI Selection

A UE can select a preferred vertical beam by measuring RSRP of a base station. The UE can report a vertical beam showing highest RSRP on the basis of the measured RSRP to the base station as a preferred vertical beam. In particular, Alt 1 is different from Alt 2 in that the RSRP-based BI selection generally uses long-term-based measurement using RSs transmitted from one or more subframes.

The RSRP can be obtained by measuring power in a CSI-RS port to which a vertical beam is applied. When the K number of $L_k$ port CSI-RS (k=0, . . . , K-1) are set to a UE, the UE measures power of each $k_{th}$ CSI-RS and uses the power as RSRP. In this case, the UE defines RSRP between CSI-RSs as average power of $L_k$ port. By doing so, although the number of port numbers is different from each other between CSI-RSs, the UE can easily compare the CSI-RSs with each other. In this case, the 'average' can be replaced with such a predetermined specific function as average to which specific weight is applied, minimum, maximum, or the like.

BI Measurement Antenna Port

Or, as shown in the following, a part of configured CSI-RS ports can be used for measuring RSRP only.

It may be able to measure power of a single port (e.g., a CSI-RS port of a lowest port number) defined in advance or defined via higher-layer signaling.

Power is measured on a port group defined in advance or a port group configured via higher-layer signaling.

The port group can be configured as follows.

Signaling RSRP port number $N_{RSRP}$—It may be able to use a port of a port number to which $N_{RSRP}$ is added from a reference port (e.g., a CSI-RS port of a lowest port number) to measure RSRP. The RSRP port number $N_{RSRP}$ can be included in a CSI-RS configuration.

A specific CSI-RS port group can be configured as a port index (e.g., CSI-RS port {15, 17}).

In particular, antenna ports of a different polarization can be included in a port group. For example, two ports of a different polarization can be defined as a port group.

In this case, measured power is averaged to easily perform comparison between CSI-RSs.

In this case, the 'average' can be replaced with such a predetermined specific function as average to which specific weight is applied, minimum, maximum, or the like. In this case, if a CSI-RS port is configured as a CSI-RS resource but the CSI-RS port is not used for measuring RSRP/CSI, the CSI-RS port can be used for a different usage (e.g., data transmission) except timing of transmitting a CSI-RS to a UE to measure RSRP/CSI. For example, when 8-port CSI-RS is configured and RSRP of the CSI-RS is measured by ports 15 and 16, resources of the ports 15 and 16 can be used for transmitting data at the rest of timings except timing (instance) of transmitting a CSI-RS for measuring RSRP and all of the remaining ports 17 to 22 can be used for transmitting data.

Since it is able to perform the aforementioned procedure by an independent process separated from a CSI calculation process, it may be able to have time/complexity gain in calculating BI to be transmitted to a base station by a UE compared to "Alt 2: CSI-based BI selection" described in the following.

Window for Measuring BI

When RSRP is measured, a UE measures power using (e.g., averaging) a measurement result measured in a window of a certain time period in general. In this case, a base station does not set a separate RSRP measurement window for BI to the UE and may follow implementation of the UE.

Or, the base station can designate time for performing the RSRP measurement for BI via higher-layer signaling and the like. If an RSRP measurement window for BI of TRSRP is designated to the UE, the UE deducts (e.g., averages power) RSRP using a CSI-RS power measurement result as much as the time and transmits the RSRP to the base station. In this case, the RSRP measurement window for BI can be configured to be disjoint with each other between windows. In this case, the power average can be replaced with a specific predetermined function such as average to which a specific weight is applied, minimum, maximum, or the like.

Method of Transmitting BI (Channel)

The BI can be transmitted via a dedicated uplink control channel such as PUCCH. The BI can be transmitted using methods described in the following.

New feedback type: A UE transmits BI to a base station by defining a separate feedback type for BI feedback. The new feedback type may correspond to a BI independent type or a type joint encoded with a different CSI. Subsequently, the UE calculates/transmits CSI by assuming the BI until a next BI is selected.

In particular, since the BI is expected to have such a long-term property as an RI, a feedback interval of the BI can be configured to be equal to or greater than a feedback interval of the RI.

New codebook including BI: It may be able to define a new codebook including BI, replacing a legacy codebook, or being added to a codebook and may be able to transmit the new codebook in a form (e.g., type, period, etc.) similar to PMI feedback.

Or, BI can be transmitted on such an uplink data channel as PUSCH via higher-layer signaling.

L3 report similar to legacy RSRP report: Since CSI calculation is performed according to a reported BI, in case of using L3 signaling, a time gap between time of decoding BI transmitted by a UE in a base station and time of calculating CSI using the BI in the UE increases. Hence, performance degradation may occur.

L2 report similar to power headroom report in MAC layer: Since BI is transmitted via MAC layer, a time gap between BI report interlocked with the BI and CSI report may be better than the time gap of the L3 scheme.

Alt 2: CSI-based BI Selection

Similar to CSI calculation, a UE measures CSI from a base station and may be then able to select a vertical beam preferred by the UE. The UE can report a vertical beam showing highest CQI on the basis of the measured CSI to the base station as a vertical beam preferred by the UE. The Alt 2 is different from the Alt 1 in that a relatively less number of measurement RS samples (e.g., a CSI-RS is measured in a single subframe) are used for selecting BI.

The CQI can be obtained in a manner of measuring CSI in a CSI-RS port to which a vertical beam is applied. When K number of $L_k$ ports CSI-RSs (k=0, . . . , K−1) are set to a UE, the UE can measure and use CSI for each $k^{th}$ CSI-RS. In this case, if the $L_k$ has a different value according to the k, a reference for the number of CSI-RS ports can be assumed as follows when CSI is calculated.

Scheme of following the number of configured CSI-RS ports

It may be able to calculate CSI for $L_k$ port CSI-RS which is defined in each CSI-RS resource. In particular, when 4-port CSI-RS 1 and 8-port CSI-RS 2 are defined, a UE calculates CSI in a manner of assuming 4 ports in response to the CSI-RS 1. The UE calculates CSI in a manner of assuming 8 ports in response to the CSI-RS 2.

Number of configured CSI-RSs less than configured CSI-RS port number

It may be able to calculate CSI for a predetermined P (<=min($L_k$)) port in response to each CSI-RS. In particular, when 4-port CSI-RS 1 and 8-port CSI-RS 2 are defined and P is defined as 4, a UE calculates CSI in a manner of assuming 4 ports in response to both the CSI-RS 1 and the CSI-RS 2.

The number of CSI-RS antenna ports is assumed to reduce impact on CQI according to the number of antenna ports or impact on a BI measurement result.

In order for a UE to select BI, it is necessary for the UE to estimate CSI for a plurality of BI candidates. Hence, in this case, time taken for the UE to select BI may be longer than time for calculating one legacy CSI. Hence, in case of selecting CSI-based BI, it may be able to restrict the number of BI candidates to be equal to or less than a prescribed number (K'). For example, if a currently selected BI exists, it may be able to make a request for calculating CSI for the current BI+adjacent 2 BIs (i.e., K'=3) only.

When an aperiodic CSI request including BI is transmitted, it may be able to use time delay of t' ms, i.e., K (or K') multiple (where K or K' is an integer) of t, longer than legacy time delay of t ms (e.g., 5 ms). A UE receives the aperiodic CSI request and performs an aperiodic CSI report after t' ms to use the time delay. The aforementioned procedure can be comprehended as a form that CSI deduction time is relaxed.

In terms of LTE standard, the aforementioned description can be comprehended as $n_{CQI-ref}$ i.e., the "time delay" is defined by a different value. Current LTE-A standard is defined as follows.

In the frequency domain, the CSI reference resource is defined by the group of downlink physical resource blocks corresponding to the band to which the derived CQI value relates.

In the time domain, for a UE configured in transmission mode 1-9 or transmission mode 10 with a single configured CSI process for the serving cell, the CSI reference resource is defined by a single downlink subframe $n-n_{CQI-ref}$, where for periodic CSI reporting $n_{CQI-ref}$ is the smallest value greater than or equal to 4, such that it corresponds to a valid downlink subframe;

where for aperiodic CSI reporting $n_{CQI-ref}$ is such that the reference resource is in the same valid downlink subframe as the corresponding CSI request in an uplink DCI format.

where for aperiodic CSI reporting $n_{CQI-ref}$ is equal to 4 and downlink subframe $n-n_{CQI-ref}$ corresponds to a valid downlink subframe, where downlink subframe $n-n_{CQI-ref}$ is received after the subframe with the corresponding CSI request in a Random Access Response Grant.

for a UE configured in transmission mode 10 with multiple configured CSI processes for the serving cell, the CSI reference resource for a given CSI process is defined by a single downlink subframe $n-n_{CQI-ref}$, where for FDD and periodic or aperiodic CSI reporting $n_{CQI-ref}$ is the smallest value greater than or equal to 5, such that it corresponds to a valid downlink subframe, and for aperiodic CSI reporting the corresponding CSI request is in an uplink DCI format;

where for FDD and aperiodic CSI reporting $n_{CQI-ref}$ is equal to 5 and downlink subframe $n-n_{CQI-ref}$ corresponds to a valid downlink subframe, where downlink subframe $n-n_{CQI-ref}$ is received after the subframe with the corresponding CSI request in a Random Access Response Grant.

where for TDD, and 2 or 3 configured CSI processes, and periodic or aperiodic CSI reporting, $n_{CQI-ref}$ is the smallest value greater than or equal to 4, such that it corresponds to a valid downlink subframe, and for aperiodic CSI reporting the corresponding CSI request is in an uplink DCI format;

where for TDD, and 2 or 3 configured CSI processes, and aperiodic CSI reporting, $n_{CQI-ref}$ is equal to 4 and downlink subframe $n-n_{CQI-ref}$ corresponds to a valid downlink subframe, where downlink subframe $n-n_{CQI-ref}$ is received after the subframe with the corresponding CSI request in a Random Access Response Grant;

where for TDD, and 4 configured CSI processes, and periodic or aperiodic CSI reporting, $n_{CQI-ref}$ is the smallest value greater than or equal to 5, such that it corresponds to a valid downlink subframe, and for aperiodic CSI reporting the corresponding CSI request is in an uplink DCI format;

where for TDD, and 4 configured CSI processes, and aperiodic CSI reporting, $n_{CQI-ref}$ is equal to 5 and downlink subframe $n-n_{CQI-ref}$ corresponds to a valid downlink subframe, where downlink subframe $n-n_{CQI-ref}$ is received after the subframe with the corresponding CSI request in a Random Access Response Grant.

In particular, according to a legacy LTE spec, in case of FDD to which multiple CSI processes are set, $n_{CQI-ref}$ is set to 5. In case of TDD to which 4 CSI processes are set, $n_{CQI-ref}$ is set to 5.

In case of the aforementioned multiple CSI resources, since a plurality of CSI-RS resources are set to a single CSI process, although a single CSI process is set to a UE only, it may be necessary for the UE to calculate CSI for each of a plurality of the CSI-RS resources to determine BI. In this case, since the UE operates as if a plurality of CSI processes have set, $n_{CQI-ref}=4$ for a legacy single CSI process may be not sufficient. Hence, if multiple CSI resources are set to a single process, it may configure a value of $n_{CQI-ref}=t$ (e.g., t=5) instead of a legacy value of $n_{CQI-ref}=4$ in case of a single CSI process. By doing so, it may be able to mitigate a burden of calculating CSI of a UE.

Or, TDD and FDD may apply a different reference. For example, in case of the FDD, if multiple CSI resources are set to a single CSI process, $n_{CQI-ref}=t$ (e.g., t=5) can be set. In case of the TDD, if multiple CSI resources equal to or greater than $K_{th}$ (e.g., 4) are set to a single CSI process, $n_{CQI-ref}=t'$ (e.g., t'=5) can be set. In this case, a base station can transmit t and t' to a UE via higher layer signaling such as RRC and t and t' can be configured by a value different from each other.

A reference for applying t (or t') value instead of a legacy $n_{CQI-ref}$ value can be applied according to a different reference instead of simply setting multiple CSI resources to a single CSI process. First of all, application of the t (or t') value instead of the legacy $n_{CQI-ref}$ value can be configured according to a value of K (number of CSI-RS resources in a single process). For example, if the K is (equal to or) greater than $K_{th}$ on the basis of a value of the $K_{th}$ configured in advance or transmitted via RRC, it may be able to configure $n_{CQI-ref}=t$ (or t'). Or, if a plurality of CSI processes are configured, application of the t (or t') value instead of the legacy $n_{CQI-ref}$ value can be configured according to a value of $$\sum_i K_i$$

(i corresponds to a CSI process index). For example, if the $$\sum_i K_i$$

is (equal to or) greater than $K_{total\_th}$ on the basis of a value of the $K_{total\_th}$ configured in advance or transmitted via RRC, it may be able to configure $n_{CQI-ref}=t$ (or t').

And/or, application of the t (or t') value instead of the legacy $n_{CQI-ref}$ value can be configured according to a value of $N_{total}$ (maximum number of CSI-RS ports in a CSI process). For example, if a value of the $N_{total}$ is (equal to or) greater than $N_{total\_th}$ on the basis of a value of the $N_{total\_th}$ configured in advance or transmitted via RRC, it may be able to configure $n_{CQI\text{-}ref}$=t (or t'). And/or, (if the number of ports is different from each other according to each resource) it may be able to configure $n_{CQI\text{-}ref}$=t (or t') using $$\sum_k N_k$$

($N_k$ corresponds to the number of CSI-RS ports of a CSI-RS resource k). For example, if a value of the $$\sum_k N_k$$

is (equal to or) greater than a specific $M_{tot\_th}$, it may be able to configure $n_{CQI\text{-}ref}$=t (or t'). And/or, if a value of $N_k$ is different from each other according to each resource, it may be able to use a representative value $N_k'$ (e.g., a biggest value) among $N_k$ values of a CSI-RS resource. For example, if the $N_k'$ is (equal to or) greater than $N_{k\_th}$, it may be able to configure $n_{CQI\text{-}ref}$=t (or t').

A base station can transmit the reference value ($K_{th}$, $K_{total\_th}$, $N_{k\_th}$, $M_{tot\_th}$, etc.) to a UE via higher layer signaling such as RRC or the like and the reference value can be differently configured in TDD and FDD. As mentioned in the foregoing description, a condition for applying relaxation can be defined or configured in a form of being partially combined between the aforementioned proposed schemes. For example, it may be able to configure or apply a value of t (and/or t') on the basis of the sum of the number of ports according to a resource in each CSI process. And, the aforementioned multiple CSI processes may correspond to multiple CSI processes belonging to a single carrier element or a union of (specific) CSI processes belonging to each carrier element when carrier aggregation is performed.

If the aforementioned embodiments of the present invention are practically implemented, the embodiments can be independently applied or can be applied in a manner of being combined with each other. For example, in case of an aperiodic CSI request, a UE can perform CSI-based BI selection. On the contrary, in case of a periodic BI feedback, it may be able to define or configure a UE to perform RSRP-based BI selection. In particular, when an aperiodic CSI reporting is performed, if BI and CSI are calculated or reported together with the aperiodic CSI report, it may be more efficient to perform the CSI-based BI selection. In this case, periodic BI feedback may become long-term measurement-based BI selection and reporting and aperiodic BI feedback may become short-term (e.g., one-shot) measurement-based BI selection and reporting.

The aforementioned embodiments can be applied not only to LTE but also to a different communication technology performing channel measurement via multiple RSs.

Figure 6:
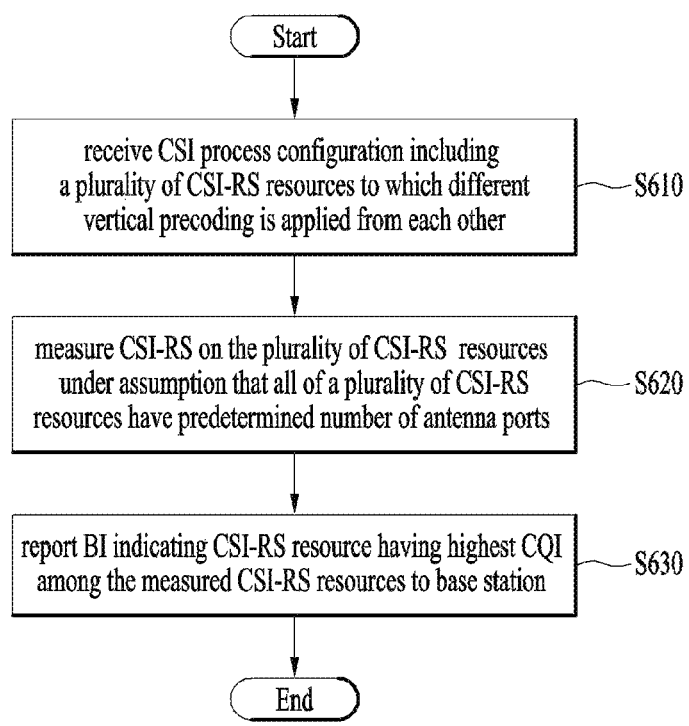
FIG. 6 is a flowchart for operations according to embodiments of the present invention.

FIG. 6 is a flowchart for operations according to embodiments of the present invention.

In a method of reporting downlink channel state in a wireless communication system according to one embodiment of the present invention, the method can be performed by a UE.

The UE can receive a CSI process configuration including a plurality of channel state information-reference signal (CSI-RS) resources to which a different vertical precoding is applied (S610).

The UE can measure a CSI-RS on a plurality of the CSI-RS resources under an assumption that all of a plurality of the CSI-RS resources include the number of pre-configured antenna ports (S620). And, the UE can report a beam index (BI) indicating a CSI-RS resource having a highest channel quality indicator (CQI) value among measured CSI-RS resources to a base station (S630).

In this case, a plurality of the CSI-RS resources can be set to the number of antenna ports different from each other.

In order to measure the CSI-RS on a plurality of the CSI-RS resources, the UE can calculate CQI in response to one or more BI candidates and the number of one or more BI candidates can be restricted to a number equal to or less than a prescribed number.

If the wireless communication system corresponds to a time division duplex system and CSI-RS resources greater than the predetermined number are set to the CSI process, the BI can be reported after the specific number (nCQI-ref) of subframes from a subframe in which a plurality of the CSI-RS resources exist.

Or, if the wireless communication system corresponds to a frequency division duplex system, the BI can be reported after the specific number (nCQI-ref) of subframes from a subframe in which a plurality of the CSI-RS resources exist.

Or, if the number of CSI-RS resources included in the CSI process is equal to or greater than the predetermined number, the BI can be reported after the specific number (nCQI-ref) of subframes from a subframe in which a plurality of the CSI-RS resources exist.

Or, when a plurality of CSI processes are set, if the total number of CSI-RS resources included in a plurality of the CSI processes is equal to or greater than the predetermined number, the BI can be reported after the specific number (nCQI-ref) of subframes from a subframe in which a plurality of the CSI-RS resources exist.

Or, if the maximum number among the number of antenna ports for each of a plurality of the CSI-RS resources included in the CSI process is equal to or greater than the predetermined number, the BI can be reported after the specific number (nCQI-ref) of subframes from a subframe in which a plurality of the CSI-RS resources exist.

Or, if the sum of the number of antenna ports for each of a plurality of the CSI-RS resources included in the CSI process is equal to or greater than the predetermined number, the BI can be reported after the specific number (nCQI-ref) of subframes from a subframe in which a plurality of the CSI-RS resources exist.

Or, if the maximum number of the number of antenna ports for a plurality of the CSI-RS resources included in the CSI process is equal to or greater than the predetermined number, the BI can be reported after the specific number (nCQI-ref) of subframes from a subframe in which a plurality of the CSI-RS resources exist.

In the foregoing description, the embodiments according to the present invention are briefly explained with reference to FIG. 6. Yet, embodiments related to FIG. 6 can alternately or additionally include at least a part of the aforementioned embodiment(s).

Figure 7:
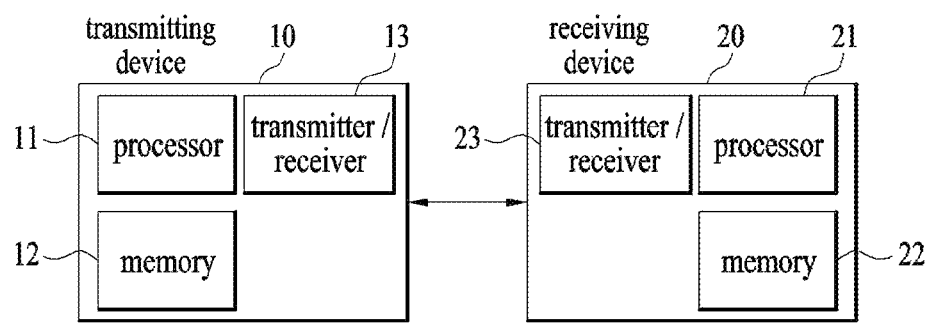
FIG. 7 is a block diagram of a device for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reporting a downlink channel state, which is performed by a terminal in a wireless communication system, the method comprising:
   receiving a CSI (channel state information) process configuration containing a plurality of channel state information-reference signal (CSI-RS) resources to which a different vertical precoding is applied;
   measuring a CSI-RS on each of the plurality of the CSI-RS resources under an assumption that all of the plurality of CSI-RS resources have a predetermined number of antenna ports; and
   reporting, to a base station, a beam index (BI) indicating a CSI-RS resource having a highest channel quality indicator (CQI) among the plurality of CSI-RS resources,
   wherein when the number of CSI-RS resources contained in the CSI process is equal to or greater than a preconfigured number of antenna ports, the BI is reported after a specific number (nCQI-ref) of subframes from a subframe which includes the plurality of CSI-RS resources.

2. The method of claim 1, wherein the plurality of CSI-RS resources is configured to have a different number of antenna ports.

3. The method of claim 1, wherein measuring the CSI-RS on each of the plurality of the CSI-RS resources includes calculating a CQI for one or more BI candidates; and
   wherein the number of the one or more BI candidates is restricted to a number equal to or less than a predefined number.

4. A terminal configured to report a downlink channel state in a wireless communication system, comprising:
a transmitter and a receiver; and
a processor that:
controls the receiver to receive a CSI process configuration containing a plurality of channel state information-reference signal (CSI-RS) resources to which a different vertical precoding is applied,
measures a CSI-RS on each of the plurality of CSI-RS resources under an assumption that all of the plurality of CSI-RS resources have a predetermined number of antenna ports,
reports, to a base station, a beam index (BI) indicating a CSI-RS resource having a highest channel quality indicator (CQI) among the plurality of CSI-RS resources,
wherein when the number of CSI-RS resources contained in the CSI process is equal to or greater than a preconfigured number of antenna ports, the BI is reported after a specific number (nCQI-ref) of subframes from a subframe which includes the plurality of CSI-RS resources.

5. The user equipment of claim 4, wherein the plurality of CSI-RS resources is configured to have a different number of antenna ports.

6. The user equipment of claim 4, wherein the processor is configured to calculate a CQI for one or more BI candidates to measure the CSI-RS on each of the plurality of CSI-RS resources, and wherein the number of the one or more BI candidates is restricted to a number equal to or less than a predefined number.

* * * * *